Dec. 15, 1970 H. J. YOUNG ET AL 3,548,162

RECORD READER

Filed Feb. 20, 1967 5 Sheets-Sheet 1

United States Patent Office 3,548,162
Patented Dec. 15, 1970

3,548,162

RECORD READER

Harry J. Young, Princeton, and William R. Behn, Somerville, N.J., assignors to Educational Testing Service, Princeton, N.J., a corporation of New York Filed Feb. 20, 1967, Ser. No. 617,149
Int. Cl. G06k 7/10; H01h 43/08
U.S. Cl. 235—61.11 5 Claims

ABSTRACT OF THE DISCLOSURE

Apparatus for reading a Hollerith-coded record to provide tactile indications of key-punched data entered on the record and the column location of such data to blind persons active in computer related arts. A photo-electric sensor scans a column to detect key-punched entries therein and generates Hollerith-coded signals corresponding thereto. A decoder extracts alpha-numeric information from the Hollerith-coded signals and generates corresponding alpha-numeric signals. A diode matrix processes the alpha-numeric signals and translates the same into Braille-coded signals to actuate a tactile data indicator. A commutator is employed to provide selective energization of a tactile column indicator to identify the particular column containing the key-punched entries.

BACKGROUND OF THE INVENTION

Field of the invention

The present invention relates to reading machines for the blind, and more particularly to automated machines which are adapted to operate upon a record medium encoded in a language other than Braille. The specific language of concern in the invention is the Hollerith code, the basic input-output language of all computing machines.

DESCRIPTION OF THE PRIOR ART

The ability to communicate fluently in the Hollerith-code is essential to programming personnel in the computer industry. At present this capacity is unavailable to the blind person, as he is restricted to communication by way of the extant mechanical card reader, a cumbersome manual reader by which an operator probes a Hollerith-coded record with a stylus to locate and interpret punched card data. This device involves a fixed record holder which cooperates with a translatable and apertured overlay to isolate a single column of data entries. A stylus is then inserted successively into the multiple apertures to detect the presence of a key-punch. The column under study is next identified by reference to a code fixed in place on the record holder adjacent each column position. In this existing scheme, no conversion from the Hollerith code to the natural language of the blind person is effected and, thus, the inherent tediousness and inefficiency of the method is compounded by the exclusion of the significant language facility of the blind operator.

The computer programming profession, whose present personnel demands are greatly unsatisfied, lends itself especially to the blind person by reason of his highly developed memory, his attentiveness to detail and his extraordinary orientation skill. This art of providing operating directions to a computer requires the formulation of a program, the insertion of such program into IBM-cards or tape by key-punching, and the detailed examination of the punched cards to insure their accuracy prior to use in a machine. While the apparatus of the invention is useful both to instruct untrained personnel and to enable skilled personnel to formulate new programs by permitting rapid study of existing programs, it is the last mentioned phase of examination, commonly referred to as the "debugging of a program," to which the invention is particularly directed. The device presently available does not permit an expeditious examination of a punched-card program and severely limits participation of the blind in the field.

General purpose reading machines presently available to the blind are automated in the sense that they incorporate electronic scanning of the recorded media for actuation of tactile Braille indicators. However, such devices are incapable of operating upon a record medium in other than the Braille language. As a result of this limitation, such general purpose machines are of no utility to the blind person occupied in computer related arts as he must work with Hollerith-coded entries. Some special reading machines for the blind are presently known and are adapted to read a language other than the Braille language, specifically, alpha-numeric characters. Such machines incorporate character recognition systems for identifying the scanned letters and means for processing the resulting signals to actuate tactile Braille indicators. However, such character recognition systems are extremely complex in nature and are not applicable to key-punched or magnetically recorded data, among which there are no distinguishing physical characteristics other than relative location. A further limitation in both types of current machines is their inability to inform the operator of the relative position in the record of the information which he is presently reading. The absence of this facility alone renders both the general and special purpose readers unsuitable for most uses in computer related arts where the relative location of information in a record is equally as important as the accuracy of the information.

In contrast to these shortcomings in the existing reading machines, the apparatus of the invention is capable of operating directly upon a record medium whose contents comprise key-punched or magnetically recorded data in the Hollerith code. In addition, the reader incorporates a constantly available reference serving to indicate the relative position of such data in the record under study.

SUMMARY OF THE INVENTION

In accordance with the invention there is provided apparatus for reading recorded data in which means are provided for advancing one of a plurality of data entries on a record into registry with a reading station which generates an output signal indicating the content of the entry. The record advancing means operates to control a signal generator whose output signal identifies the relative location of the data entry being read among the plurality of data entries on the record. These output signals designating content and location are then utilized in associated equipment to indicate or further process the information. More specifically, the invention embodies a record reader assembly comprising a translatable record transport adapted to retain and incrementally advance a Hollerith-coded record, such as an IBM-card or perforated tape, into registry with a photo-electric reading station. In response to key-punched data entries in the record, the reader supplies Hollerith-coded output signals to a decoder wherein the signals are converted by a relay logic system to alpha-numeric signals corresponding to the Hollerith-coded data entries. These alpha-numeric signals are processed in a diode matrix wherein they are transformed into Braille-coded signals for actuating a tactile data indicator. Further, the record transport includes a plurality of appendages which selectively engage a commutator as the record transport is moved incrementally to different column positions. A pair of tactile column indicators, representing the units and tens digits of the column under consideration, are energized in response to the selective engagements of the record transport appendages and the commutator.

It is a primary object of this invention to provide a reading machine for the blind which solves the problems of the prior art pointed out above in a relatively simple and quite practical manner, and which is particularly capable of operating directly upon record media bearing key-punched information in the Hollerith code.

It is a further object of the invention to provide a reading machine for the blind which both identifies data entries in a record medium and provides information as to the relative position of such data entries in the record under study.

It is a further object of the invention to provide an improved photo-electric IBM-card data reader incorporating commutator means for identifying column information.

It is an additional object of the invention to provide a reading machine for the blind which is capable of reading key-punched alpha-numeric entries in a record medium and of distinguishing the alphabetic and numeric entries.

It is another object of the invention to provide an improved reading machine for the blind which is relatively simple, compact and inexpensive in construction.

The foregoing and other objects, features and advantages of the invention will be apparent from the following more particular description of a preferred embodiment of the invention.

Since the subject invention provides a communication link between the Hollerith and Braille codes, it is desirable, by way of introduction, to consider the particulars of each of these coding systems. The standard record medium for Hollerith-coded computer data is the conventional IBM-card or tape containing key-punched data. The card comprises eighty vertical columns numbered 01 through 80 and each column has the capacity for containing one of many distinct data entries, which may include the ten numeric characters 0 through 9, and the twenty-six alphabetic characters A through Z. Other data may include a variety of symbols, such as punctuation marks or the like, but for simplicity, such data entries need not be considered here. The conventional card has twelve horizontal rows which are designated from top to bottom as the 12 position, the 11 position, the 0 position, the 1 position, etc., down through the bottom entry on the card which is designated the 9 position. To enter a numeric character in a given column a key-punch is entered in that column at a single position 0 through 9. In entering the alphabetic characters in a given column, two punches are entered in the column, the first punch in either the 0 position, the 11 position or the 12 position, and the second punch in one of the positions 0 through 9. Specifically, to enter the characters A through I, the 12 position is used in conjunction with one of the 1 through 9 positions. For example, to enter the alphabetic character A, the column would contain a 12 punch and a 1 punch. Alphabetic character I is entered by a 12 punch and a 9 punch. The alphabetic characters J through R are entered by a punch in the 11 position along with a punch in one of the positions 1 through 9. For example, the alphabetic character J would be identified by a punch in the 11 position and a punch in the 1 position, whereas alphabetic character R would correspond to a punch in the 11 position and a punch in the 9 position. The remaining alphabetic characters S through Z are entered in the card by employing the 0 punch along with a punch in one of the positions 2 through 9. For example, the alphabetic character S is entered in the card by a 0 punch and a 2 punch and the alphabetic character Z is identified by a 0 punch and a 9 punch. The 1 position is not employed in conjunction with the 0 position, since entries in these adjacent positions may give rise to confusion.

The Braille code is a six element system in which various combinations of the six individual elements identify the twenty-six alphabetic characters and the ten numeric characters. The particular combination of elements assigned to each character is standard and is known as the Braille alphabet. Unlike the Hollerith code, which provides for separate identification of alphabetic and numeric characters, Braille alphabetic characters A through J and the numeric characters 1 through 9 and 0 are individually identified by the same element patterns and, thus, the blind reader is unable to distinguish between such characters as B and 2, C and 3, or J and 0. The invention improves on the normal Braille indicator in this regard since it provides a built-in distinction in this area of confusion.

BRIEF DESCRIPTION OF THE DRAWINGS

The preferred embodiment is illustrated in the accompanying drawings, wherein like numerals identify similar parts throughout.

DESCRIPTION OF THE PREFERRED EMBODIMENT

Figure 1:
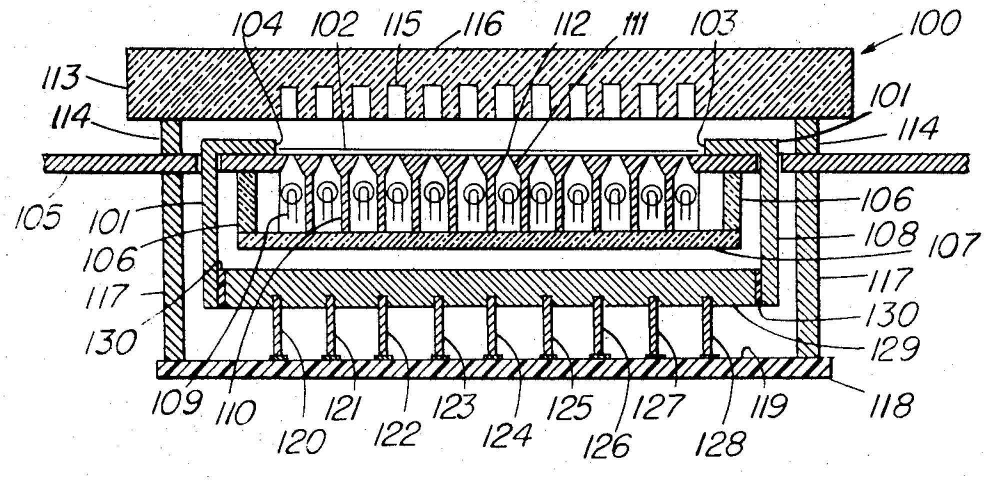
FIG. 1 is a side elevational view of the present record reader of a reading machine.

With reference to FIG. 1 of the drawings, the record reader assembly 100 comprises a record transport 101 which retains a card 102 to be studied in the central area defined in part by opposed faces 103 and 104. Record transport 101 is supported for incremental linear advance along base plate 105 by any suitable means such as sealed ball bearings. Base plate 105 is also equipped with suitable detent means to provide for movement of transport 101 in increments equal to the distance between successive columns of information on the record. Within the confines of transport 101 and rigidly connected to base plate 105 by side supports 106 and transverse member 107 is a light source 108 comprising individual lamps 109 which are isolated from one another by opaque separators 110. Twelve such lamps are provided, corresponding to the twelve data positions in the Hollerith code, and the lamps outputs are directed by suitable channeling 111 in base plate 105 to minute apertures 112 in the base plate surface. A photocell unit 113 is disposed directly above said apertures being rigidly supported in position by side support members 114 attached to base plate 105. Photocell unit 113 comprises an assembly of twelve individual photo-sensitive elements 115 positioned in cell holder 116 precisely opposite the corresponding lamps 109 of light source 108. Members 117 are fixedly connected to base plate 105 for the purpose of supporting a commutator assembly 118 which incorporates a printed circuit on its upper surface 119. A series of contact fingers 120 through 128 are supported so as to contact surface 119 by a conductive contact strip 129 which is in turn supported with insulators 130 by transport 101.

Figure 1A:
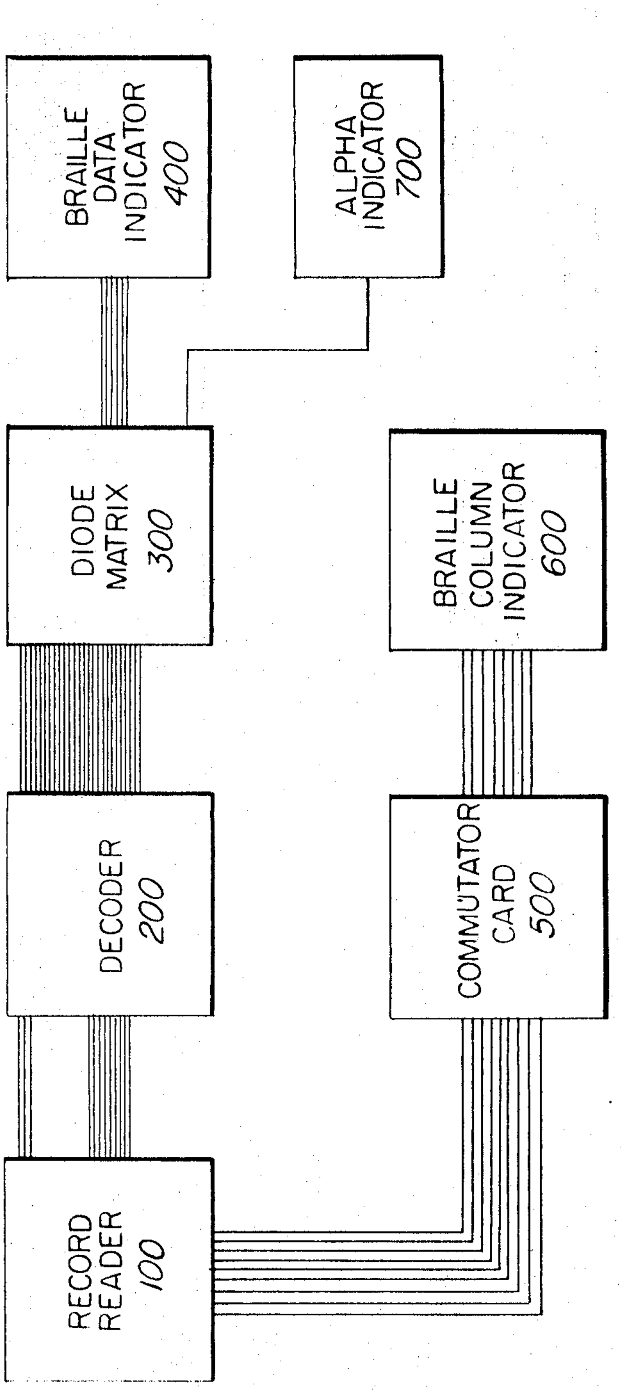
FIG. 1*a* is a block diagram indicating the functional operation of the machine.

The block diagram of FIG. 1*a* will serve to illustrate the circuits which operate with the record reader assembly to provide tactile data and column information. Record reader 100 senses key-punched data entries in the column under study and provides twelve output signals which indicate the data entries in the card. The upper group of these signals correspond to card positions 12, 11 and 0. The lower group of output signals represent the card positions 1 through 9. All of these output signals are applied to decoder 200 whose function is to translate this Hollerith-coded information into a series of twenty-six output signals comprising the alphabetic and numeric characters discussed above. To this effect, the decoder makes one of several decisions as to the identity of the reader output signals and energizes the particular output lines corresponding therewith. A basic decision made by the decoder is that of determining whether the data under consideration is alphabetic or numeric and this decision is indicated in alpha indicator 700. The remaining twenty-six output signals of decoder 200 are applied to diode matrix 300, whose function is to translate the incoming signal into appropriate actuating signals for Braille indicator 400. Braille indicator 400 is a standard means of presentation for the blind comprising six displaceable plungers responsive to the six output signals of the diode matrix. The system described to this point accomplishes what may be termed the data reading function, and these elements are identified as the data channel. An essential adjunct to this data channel is the column channel, whose function is to provide a constant indication of the identity of the column under consideration. To this effect, nine record reader outputs representing the contact fingers 120 through 128 are applied to commutator card 500, which is connected by eight output lines to Braille column indicator 600. This indicator comprises two separate groups of six displaceable plungers which indicate the tens and units digits of the column being read. Then energizing signals for such plungers are applied to the contact fingers of the record reader 100 and selectively gated through the commutator 500 which is so designed that each of the eighty columns of the card has a specific identification therein.

Figure 2:
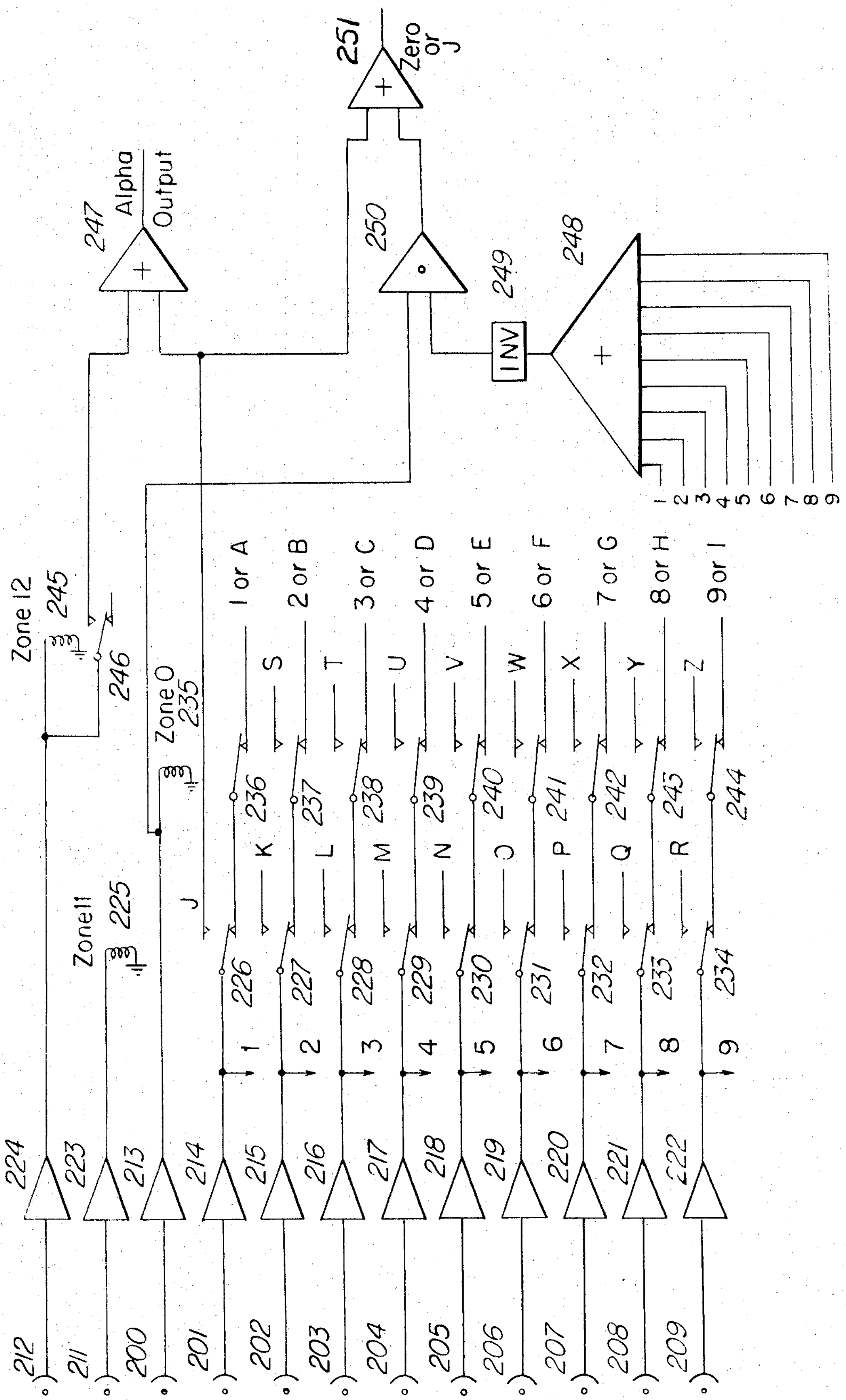
FIG. 2 is a schematic diagram of the decoder circuit.

The operation of decoder 200 of FIG. 1*a* may best be understood by reference to FIG. 2, which sets forth the logic arrangement necessary to translate the data signals derived from the record reader 100 into appropriate signals for application to diode matrix 300. As a particular card column is advanced into registry with the reading station of record reader 100, certain photocells 200 through 212 are energized and the output signals thereof are applied to amplifiers 213 through 224. These amplifiers serve to raise the level of the photocell output sufficiently to actuate relays and may be power amplifiers, voltage-sensitive switches or reed relay arrangements. A first group of signals are derived from photocells 200, 211 and 212 and, after amplification in units 213, 223 and 224, serve to control relays 235, 225 and 245. The second group of signals are derived from photocells 201 through 209 and are amplified in units 214 through 222 and the outputs thereof are applied to the contact arms 226 through 234 of relay 225. The relay is designated as zone 11 and is energized only when a key-punch occurs in the 11-position on the card. The relay 235 is designated zone 0, and is energized only when a key-punch is entered in the 0-position of the card. The remaining relay 245 is designated as zone 12 and is energized only when a key-punch occurs in the 12-position of the card. The operation of the decoder and of these relays will become evident by an examination of the decisions which are to be made in the decoder as various alphabetic or numeric data appear on the card.

In the first case, one of the numerics 1 through 9 appear on the card. In this case, none of the zone relays are energized and the particular photocell output is amplified and gated through the normally closed contacts of relays 225 and 235. For instance, if a key-punched 5 occurs on the card, photocell 205 is energized and its output signal amplified in amplifier 218. The amplifier output is applied to contact arm 230 of relay 225, through the normally closed contact thereof, to contact arm 240 of relay 235 and finally through the normally closed contact thereof to the decoder terminal designated at 5 or E. Since zone 12 relay 245 is unenergized at this time, the decoder does not provide an output at decoder alpha output terminal. Thus, alpha indicator 700 is not actuated and the operator recognizes the entry as the numeric 5 rather than the alphabetic E.

For alpha entries A through I, a 12-punch is entered on the card in addition to a punch in one of the positions 1 through 9. As a result, the zone 12 relay 245 is energized by the output of amplifier 224 and the amplifier output is applied through contact arm 246 to an OR gate 247, whose output will actuate alpha indicator 700. At the same time, the particular data entry in card positions 1 through 9 will be processed as was the numeric 5 considered in the preceding example.

For alphabetical characters J through R, a key-punch is entered in card position 11 along with a single entry in one of the card positions 1 through 9. As a result the zone 11 relay 225 will be energized by amplifier 223. If the entry is, for example, the letter K, the key-punch data in the card is a punch at position 11 and a second punch at position 2. Photocell 202 will be energized and its output signal amplified in amplifier 215. The output of amplifier 215 is conducted through the contact arm 227 of the now energized relay 225 and through the normally open contact thereof to decoder terminal K.

In the case of the alphabetical characters S through Z, a key-punch is entered in the 0-position of the card and a second punch is entered in one of the positions 2 through 9. During the reading of these characters the zone 0 relay 235 is energized by amplifier 213. If the entry in question is the letter W, key-punches in the card occur at positions 0 and 6. Photocell 206 is stimulated whereupon the amplified signal from amplifier 219 is conducted through contact arm 231 of relay 225 and the associated normally closed contact thereof to contact arm 241 of relay 235. With relay 235 in its energized state, the signal is conducted through the normally open contacts of relay 235 to decoder terminal W.

The OR gate 247 is incorporated in the system for the limited purpose of eliminating confusion for the blind reader in those cases where the Braille alphabet employs a common designation for alphabetical and numeric characters. As mentioned above, this occurs for the alphabetic characters A through I which have the same Braille designation as the numerics 1 through 9. There is an additional case where this confusion occurs and that is in the case of alphabetic J and numeric 0. Thus, gate 247 is provided with a first input from zone 12 relay 245 which is always energized when the alphabetics A through I are being decoded and a second input which is energized when alphabetic J is decoded. No alpha indicator actuation is needed for the remaining alphabetical characters K through Z in that these alphabetic characters have singular Braille representations.

From the above it is clear that the positions 0, 11 and 12 are employed in conjunction with positions 1 through 9 to indicate the three divisions of alphabetic entries in the Hollerith code. The 0-position, however, performs the additional function of indicating the numeric 0 and in this case only the 0-position contains a key-punch. The decoder employs logic circuity to detect the presence of the numeric 0 by ascertaining that the required conditions exist. The system first detects whether any one of the card positions other than the 0-position contains an entry. This is accomplished in OR gate 248 which receives inputs from card positions 1 through 9 and generates an output whenever any position contains a data entry. The output of gate 248 is then applied to an inverter 249 which provides an inhibit signal to AND gate 250 if any such data exists. The system next notes the existence of the 0 punch by conducting the amplified output of photocell 200 to the remaining input of AND gate 250. AND gate 250 will provide an output indicating numeric 0 only when a 0-punch is entered on the card and no punch exists in positions 1 through 9. It will be noted that the condition of the card positions 11 and 12 is inconsequential, since key-punches never coexist in positions 11 or 12 and 0. The output terminal of AND gate 250 is connected to OR gate 251 which provides J or numeric 0.

By this simple arrangement of three zone relays and several logic gates, the decoder is enabled to perform the several essential decisions in converting Hollerith-coded data to alpha-numeric information. First, the decoder decides whether the incoming data is numeric 0 through 9. Secondly, the unit decides whether the data entry is alphabetic A through I. Further, the decoder determines whether the data is alphabetic J through R or S through Z.

Figure 3:
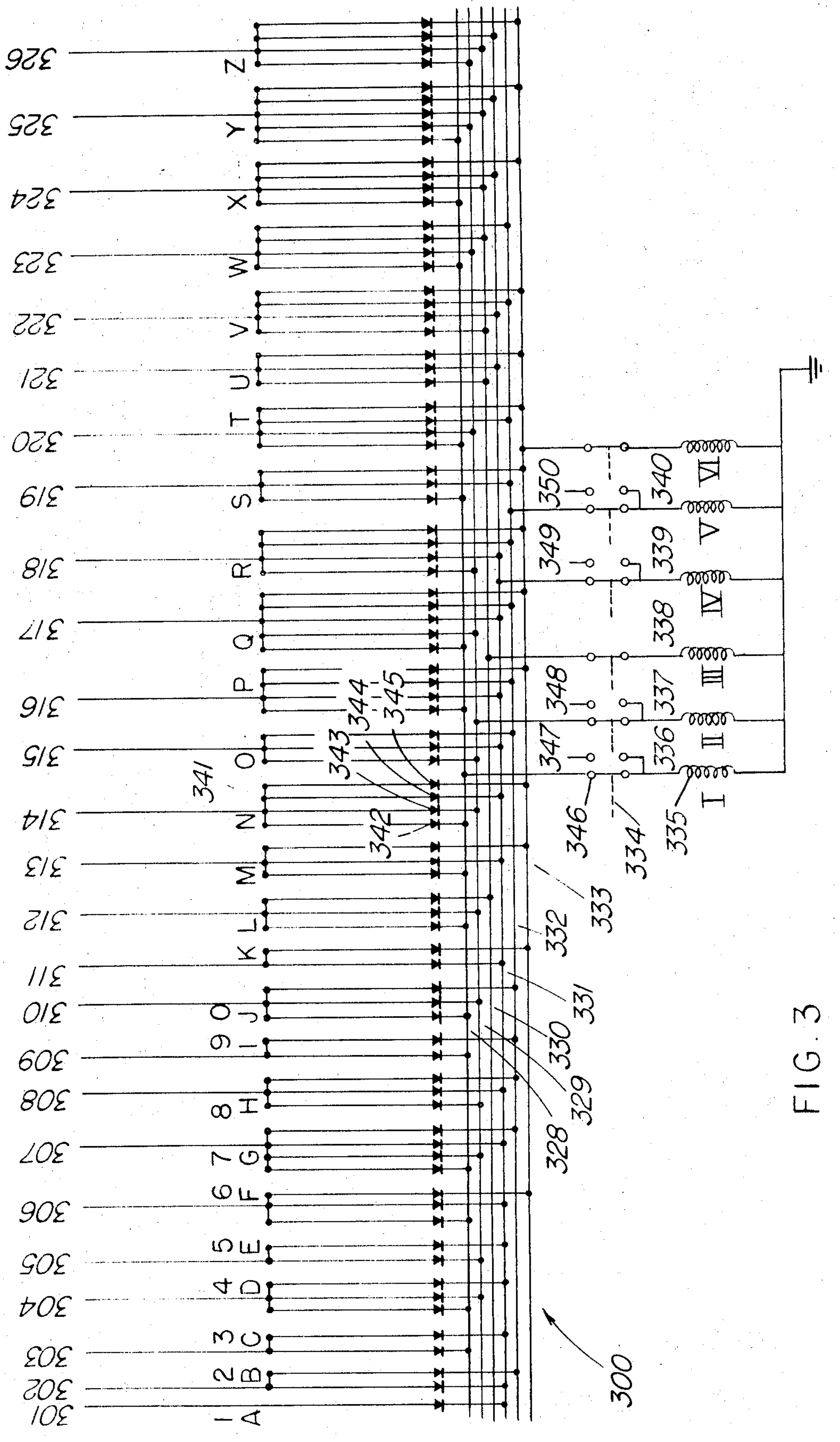
FIG. 3 is a schematic diagram of the diode matrix.

The output terminals A through Z of the decoder are connected to input terminals 301 through 326 of the diode matrix 300 shown in FIG. 3. This unit accomplishes the standard alphabetic to Braille translation through a matrix comprising eighty-four individual diodes which are selectively interconnected between the input terminals 301 through 326 and the six control solenoids of the Braille touch indicator assembly 400 shown in FIG. 4. The six elements of the Braille code are designated by the Roman numerals I through VI and the touch indicator solenoids corresponding thereto are shown at 335 through 340. The solenoids are connected to system ground and to the lower terminals of normally closed switch 334. The corresponding upper terminals of switch assembly 334 are connected to the six transverse conductors 328 through 333. A study of the combinations effected along the six transverse connectors will indicate the manner in which certain of the solenoids 335 through 340 are energized. As a typical example, let us assume that the decoder has determined the key-punch entry on the card under consideration to be the alphabetic N. An actuating signal is conducted through input terminal 314 and through the terminal strip 341 to the anodes of diodes 342 through 345 which define a four-diode OR gate with a common input. The cathodes of the diodes are connected respectively to the transverse conductors 328, 329, 331 and 333. Consequently all of these transverse conductors are energized. These conductors are in turn connected respectively to the solenoids 335, 336, 338 and 340. As these particular solenoids are energized the Braille symbol I–II–IV–VI, corresponding to the letter N, is displayed.

Figure 4:
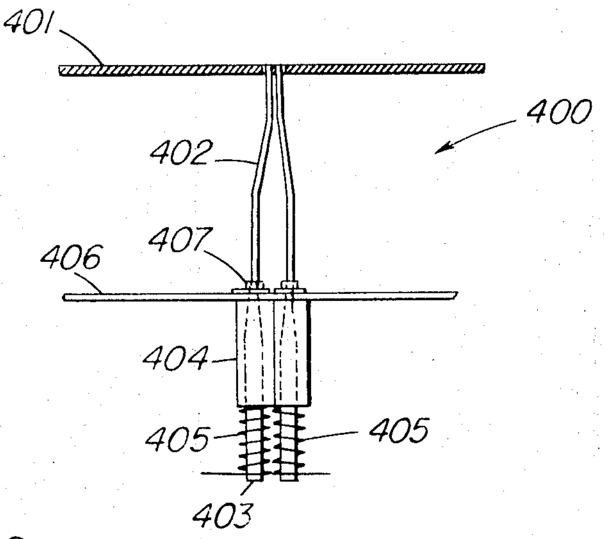
FIG. 4 is a side elevational view of the Braille touch indicator assembly.

A conventional Braille touch indicator assembly 400 is shown in FIG. 4. The assembly comprises plate member 401 having six surface apertures, in which the tips of push rods 402 are disposed. The push rods 402 are controlled so as to provide a particular Braille character at the plate surface. To this effect, push rods 402 are connected to plungers 403 of solenoids 404, the windings 405 of which (corresponding to solenoid windings 335–340 of FIG. 3) are controlled to display the appropriate Braille character. The six solenoids employed in the Braille touch indicator assembly are clustered in two rows of three and are supported in solenoid mount 406 by retainer clips 407. One such Braille touch indicator assembly is needed for the data channel to present the information generated therein. As will be discussed below, the switch member 334 of FIG. 3 may be employed to permit a sharing of this single Braille touch indicator assembly between the data channel and the column channel.

The above-described apparatus provides an efficient and heretofore unknown rendition of the data contents of a record medium to the tactile sense of a blind operator and finds application in instances where data alone is desired. In certain situations, however, it is essential that the precise location of such data in the record be ascertained. It is in this column identification function that the present invention departs completely from known reading machines which provide no indication whatever of the precise location of the presently read contents of a record. The parallel information channel of the invention is constantly available to the operator to apprise him of column information in debugging or spot-check investigations.

Figure 5:
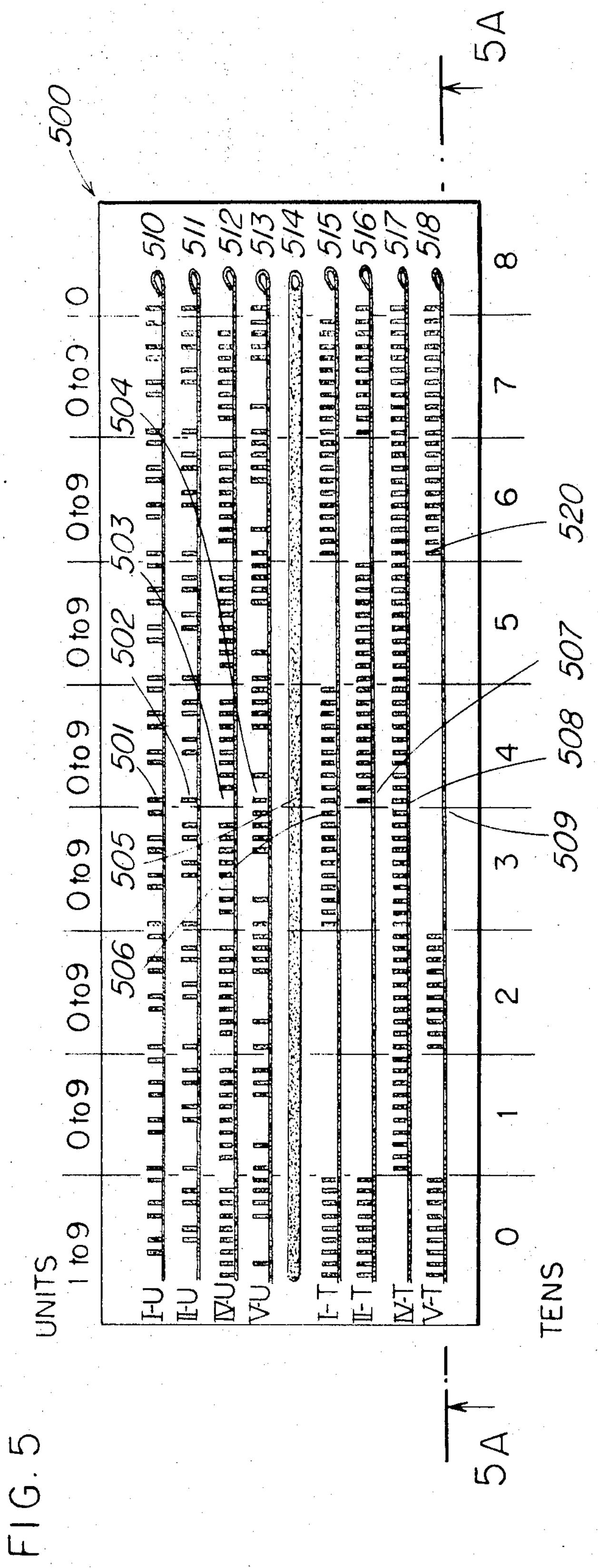
FIG. 5 is a plan view of the printed circuit card serving as the commutator of the invention.
Figure 5A:
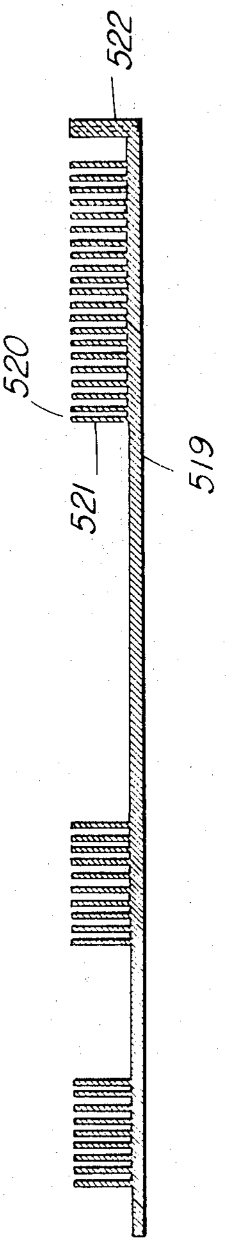
FIG. 5*a* is a side elevational view of row 509 of the printed circuit card of FIG. 5.

Referring again to FIG. 1, the column identification is accomplished through the cooperation of commutator assembly 118 and the contact fingers 120 through 128 of record reader 100, which are adapted to make certain circuits through the printed circuit disposed on the inner surface 119 of the commutator. The contact fingers are conductive and are electrically connected in common by conductive strip 129 which serves the additional function of supporting the contact fingers as they traverse the printed circuit. The contact strip 129 is rigidly connected by insulators 130 to the transport frame 101, whereby the contact fingers are moved across the commutator surface as the card transport frame 101 is incrementally moved to examine different columns. The commutator card 500 of commutator assembly 118 is shown in detail in FIG. 5 to comprise a printed circuit which includes nine independent circuits arranged in rows 501 through 509, having terminals 510 through 518 which provide for connections to associated circuitry. Each row comprises a particular arrangement of printed circuit pads 520, each pad being connected to a continuous conductor leading to the aforementioned terminal. The row 505 is distinct from the remaining printed circuit rows in that it defines a continuous circuit throughout, i.e., there is a printed circuit pad 520 at each and every position along this row.

The structure of the printed circuit may be seen more particularly in FIG. *5a*, which represents a sectional elevation of row 509. The circuit comprises a continuous conductor or substrate 519 which has been appropriately etched to provide three discrete sections of pads 520 which connect with the substrate by conductors 521 which are remnants of the etching process. In addition, the row 409 incorporates an end portion 422 which contains an eyelet which forms terminal 518. The remaining etched areas of the card contain a dielectric substance.

The printed circuit is so disposed below the contact fingers 120 through 128 that fingers traverse the rows 501 through 509 respectively, with contact finger 124 moving along the continuous row 505.

Since there are eighty independent columns on the standard IBM-card, the six element Braille touch indicator, which has a Braille-defined capacity for the numerals 0 through 9 only, is insufficient to indicate the entire column information. To overcome this difficulty, the subject reading apparatus employs two indicators for presenting column information, one of which will indicate the tens digit of the particular column and the other of which will indicate the units digit of the particular column. For example, for the column 76, the tens indicator will present a Braille 7 and the units indicator will present a Braille 6. As will be explained in more detail below, the contact fingers 120 through 123 will cooperate with the printed circuit rows 501 through 504 to indicate the units digit. The contact fingers 125 through 128 will cooperate with the printed circuit rows 506 through 509 to indicate the tens digit.

Each row of the commutator is divided into nine sections, corresponding in number to the tens digits to be read, namely, 0 through 8. Each of these sections is further divided into a sufficient number of subsections to indicate all unit digits which might occur in the associated tens section. To this effect, the sections corresponding to tens digits 1 through 7 each comprise ten subsections, representing the columns 10 through 79. The section corresponding to tens digit 0 comprises nine subsections representing columns 01 through 09. The section corresponding to the eight tens digit, includes a single subsection representing column 80.

Figure 6:
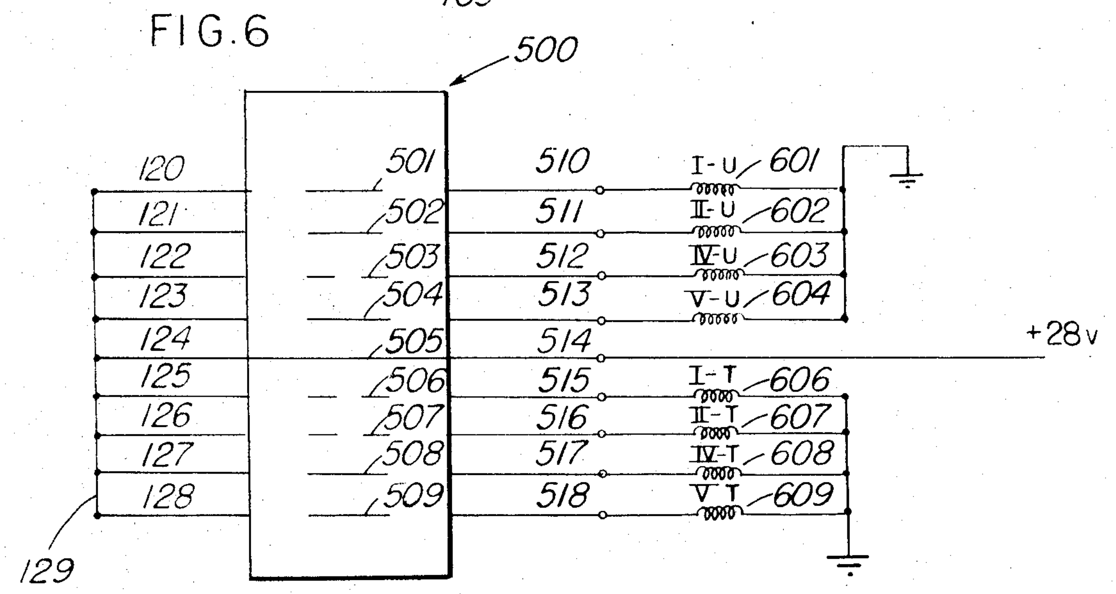
FIG. 6 is a partly schematic diagrammatic view indicating the condition of the column indicator solenoids and commutator for conditions existing as column 20 is under study.

The circuitry of FIG. 6 indicates the interconnections between the commutator card 500 and the two Braille indicators for the units and tens digits. The indicators are of the type described above in FIG. 4, but the Braille elements III and VI are not used since they are not employed in presenting 0 through 9. In the units indicator the coils 601 through 604 respectively actuate the Braille plungers for the elements I–U, II–U, IV–U and V–U. In the tens indicator the coils 606 through 609 respectively actuate the Braille plungers for the elements I–T, II–T, IV–T and V–T. Each of these coils is connected to the D.C. power supply serving all system operations except the reading station light source. The remaining terminals of the coils are coupled to the printed circuit terminals 510 through 513 and 515 through 518. The printed circuit connector 514 is connected directly to the ground terminal of the power supply. These connections complete the permanent connections required to exist between the commutator, and units and tens Braille touch indicator assemblies and the power supply. The remaining circuit connections for the selective energization of the coils 601 through 609 vary with the change in column position and are effected through the interaction of the contact fingers 120 through 128 and the corresponding rows 501 through 509 of the commutator card 500.

A specific example of such selective energization is shown in FIG. 6, which corresponds to column channel conditions existing during the examination of data entries in card column 20. The ground return for the power supply connected to printed circuit terminal 514 is conducted through the continuous commutator row 505 to contact finger 124. Contact finger 124 is in turn connected in common to the remaining contact fingers 120 through 128 by conductive contact strip 129. Thus, a ground return signal is applied at all times to all rows of the printed circuit commutator card 500. At this time, however, only certain of the printed circuit rows have pads 520 positioned below the contact fingers. By inspection of FIG. 5 it will be noted that the printed circuit rows 501, 502, 504, 508 and 509 are the only rows having pads 520 below the contact fingers. This condition is represented in FIG. 6 by the continuous lines shown at the appropriate rows, whereby the ground return is coupled through the commutator to the printed circuit terminals 510, 511, 513, 517 and 518. The result at the units indicator is the energization of solenoid coils 601, 602, and 604 which, in turn, actuate the plungers for elements I–U, II–U and V–U. This combination represents the numeric 0 to the blind operator. At the tens digit indicator, coils 608 and 609 are energized, actuating the plungers for elements IV–T and V–T. This combination represents the numeric 2 to the blind operator. The two indicators are considered together by the operator to determine that the column 20 is in registry with the reading station of record reader 100.

The system described to this point employs three Braille touch indicator assemblies, one for indication of data, a second for the units column digit and a third for tens column digit for column presentation. By the use of sharing switch 334 shown in FIG. 3, the units column digit indicator is eliminated. This is accomplished by sharing the data indicator between two functions, i.e., data and units column digit presentation. In FIG. 3, the right hand normally open terminals 347, 348, 349 and 350 of the ganged sharing switch 334 are connected respectively to the terminals 510, 511, 512 and 513 of the commutator card 500. By this simplification, the function of solenoids 601, 602, 603 and 604 (FIG. 6) of the eliminated units column digit indicator assembly is performed by solenoids 335, 336, 338 and 339 of the data indicator upon depression of switch 334.

The reading machine preferably employs two D.C. power supplies. The first unit provides operating power for all system circuitry with the exception of the twelve lamps constituting light source 108. Lamp light output must remain constant regardless of the fluctuation in current requirements caused by the rest of the reading machine. Thus, the second power supply is used exclusively for the lamps. On the other hand, a single power supply may be employed provided it includes adequate isolation of the lamp circuit from voltage fluctuations which are caused primarily by solenoid actuation in the Braille touch indicators.

To operate the reading machine, a card is first inserted in the record transport. The front of the card may be determined by the position of the corner cut. Power is next applied to the machine and the sharing switch 334 is placed in a column reading position. At this time the operator places his fingers over the two Braille touch indicators and advances the record transport incrementally until the desired column is reached. He then places the sharing switch 334 in the data reading position and detects the data entered in the particular column under study by examining the shared Braille touch indicator assembly. Alpha indicator 700 is preferably an audible indicator of any suitable form such as a buzzer. Alternatively, this indication that an alphabetic character A through J is decoded may be presented by activation of either of the two surplus solenoids III and VI of the tens column digit indicator.

In the portable version constructed in accordance with the preferred embodiment taught herein, the simplicity of the machine has permitted it to be accommodated in a four inch attaché case. It is clear, however, that the various circuits and apparatus employed in the reading machine may be adapted to existing card readers serving computer input-output operations in permanent installations.

It should be understood that the particular record reader illustrated by way of example in the described embodiment could be replaced by other types of readers such as magnetic, conductive contact and the like. It should also be understood that the IBM-card is intended as representative of any record medium containing Hollerith-coded data entries, such as magnetic tape, perforated tape and the like. It should be evident also that any diverse code may be read by the machine by suitable modification of the decoder such that it performs a translation of data entered in such diverse code into the alphanumeric code.

Furthermore, while the invention has been particularly shown and described with reference to a preferred embodiment thereof, it will be understood by those skilled in the art that various changes in form and detail may be made without departing from the spirit or scope of the invention.

What is claimed is:

1. A record reader adapted for use by the blind comprising:

(a) a reading station including means sensing data entries arranged in a succession of locations on a record, decoder means providing output signals indicative of the alphabetic and numeric characters represented by said data entries, and means translating said output signals into first Braille-coded signals;

(b) a record transport for selectively moving said record to position each data entry in said succession at said reading station;

(c) signal generator means operable responsively to movements of said record transport to produce second Braille-coded signals each having distinct characteristics denoting the particular location in said succession of locations of each sensed data entry;

(d) tactile indicators actuated by said first and second signals and providing indication of said sensed data entries and said locations of same; and (e) discriminating means for distinguishing said reading station output signals indicative of alphabetic and numeric characters having a common Braille-coded designation.

2. The record reader claimed in claim 1 wherein said signal generator means includes a series of switches operable in selected combinations upon said record movements and producing said second Braille-coded signals.

3. The record reader claimed in claim 1 wherein said translating means comprises a plurality of diode gating circuits, each operating to provide a distinct one of said first Braille-coded signals.

4. The record reader of claim 2, in which said switches comprise first contact means arranged in groups corresponding each to a different location within the succession and second contact means carried by said record transport, said second contact means engaging said first contact means as said record transport is moved.

5. The record reader of claim 4, wherein said first contact means comprise conductive portions of a printed circuit.

References Cited

UNITED STATES PATENTS

| | | | |
|---|---|---|---|
| 1,889,576 | 11/1932 | Snook | 340—146.3X |
| 2,518,694 | 8/1950 | Jannopoulo | 235—61.11(5)X |
| 2,842,245 | 7/1958 | Frey | 197—6.1UX |
| 3,033,448 | 5/1962 | Quinn | 235—61.11(5) |
| 3,443,068 | 5/1969 | Tucker et al. | 235—61.11 |

OTHER REFERENCES

Jacquet, "Card Reader with Column Emitter," IBM Technical Disclosure Bulletin, vol. 5, No. 1, June 1962, page No. 54.

DARYL W. COOK, Primary Examiner

T. J. SLOYAN, Assistant Examiner

U.S. Cl. X.R.

200—46

PO-1050
(5/69)

UNITED STATES PATENT OFFICE
CERTIFICATE OF CORRECTION

Patent No. 3,548,162 Dated December 15, 1970

Inventor(s) Harry J. Young and William R. Behn

It is certified that error appears in the above-identified patent and that said Letters Patent are hereby corrected as shown below:

Col. 1, line 48, delete "card".
Col. 2, line 16, after "special" insert --purpose--.
Col. 4, line 54, "lamps" should read --lamp--.
Col. 5, line 31, "Then" should read --The--.
Col. 5, line 54, after "relay" (second instance) insert --225--.
Col. 5, line 75, "at" should read --as--.
Col. 8, line 29, "409" should read --509--.
Col. 8, line 30, "422" should read --522--.

Signed and sealed this 20th day of April 1971.

(SEAL)
Attest:

EDWARD M. FLETCHER, JR.
Attesting Officer

WILLIAM E. SCHUYLER, JR.
Commissioner of Patents